(12) United States Patent
Nigatu et al.

(10) Patent No.: US 11,084,314 B2
(45) Date of Patent: Aug. 10, 2021

(54) VIRTUAL SECURITY ELEMENT

(71) Applicant: Gemalto Inc., Austin, TX (US)

(72) Inventors: Tadesse G. Nigatu, Cottage Grove, MN (US); Oredola O. Taylor, St. Paul, MN (US); Olivier Pagnon, Saint Paul, MN (US); Sorin Grigorescu, Meudon (FR)

(73) Assignee: THALES DIS USA, Inc., Austin, TX (US)

( * ) Notice: Subject to any disclaimer, the term of this patent is extended or adjusted under 35 U.S.C. 154(b) by 0 days.

(21) Appl. No.: 16/729,418

(22) Filed: Dec. 29, 2019

(65) Prior Publication Data

US 2021/0197611 A1 Jul. 1, 2021

(51) Int. Cl.
*B42D 25/373* (2014.01)
*B42D 25/342* (2014.01)
*G03H 1/00* (2006.01)
*B42D 25/328* (2014.01)

(52) U.S. Cl.
CPC ......... *B42D 25/373* (2014.10); *B42D 25/328* (2014.10); *B42D 25/342* (2014.10); *G03H 1/0011* (2013.01)

(58) Field of Classification Search
CPC .. B42D 25/373; B42D 25/342; B42D 25/328; G03H 1/0011

USPC ...... 283/67, 70, 72, 74, 86, 87, 94, 98, 109, 283/110, 901, 904
See application file for complete search history.

(56) References Cited

U.S. PATENT DOCUMENTS

2013/0154250 A1\* 6/2013 Dunn ................... B42D 25/342
283/67

\* cited by examiner

*Primary Examiner* — Justin V Lewis
(74) *Attorney, Agent, or Firm* — The Jansson Firm; Pehr B. Jansson

(57) ABSTRACT

A data carrier (1) comprises at least a first guiding element (2), at least a first processing element (3), and at least a first security element (4). The first processing element (3) is arranged after the first guiding element (2) with respect to an extension direction (E). The first guiding element (2) is configured to guide impinging electromagnetic radiation towards the first processing element (3). The first processing element (3), in an unprocessed state, is semi-opaque or opaque. In a processed state after being impinged by electromagnetic radiation that is irradiated through the first guiding element (2) onto the first processing element (3), the first processing element (3) in the region of impingement comprises at least a first processed region (5) in the form of a transparent region or translucent region or a hole. The first guiding element (2) and the first processed region (5) at least partially overlap when viewed along the extension direction (E), whereby the first security element (4) is generated.

25 Claims, 7 Drawing Sheets

VIRTUAL SECURITY ELEMENT

TECHNICAL FIELD

The present invention relates to a data carrier comprising at least a first security element according to claim 1 and to a method of producing at least a first security element in a data carrier according to claim 15, respectively.

PRIOR ART

Laser sensitive substrates and lens shaped micro-structures are commonly used for the generation of security elements in data carriers that correspond to or are provided in security documents such as identity cards, passports, banknotes or the like. To this end, it is known to generate color floating or LEFI (Laser Engraved Floating Image) virtual images by passing high-energy laser radiation through transparent lenses so as to generate burned marks on the substrate behind the lenses. In this way, a floating image of a dark appearance is produced.

SUMMARY OF THE INVENTION

It is an object of the present invention to provide a data carrier having at least one security element of increased security.

This object is achieved with a data carrier according to claim 1. In particular, a data carrier is provided, which data carrier comprises at least a first guiding element, at least a first processing element, and at least a first security element. The first processing element is arranged after the first guiding element with respect to an extension direction. The first guiding element is configured to guide impinging electromagnetic radiation towards the first processing element. The first processing element, in an unprocessed state, is semi-opaque or opaque. The unprocessed state corresponds to a state where no electromagnetic radiation has been irradiated onto the data carrier. In a processed state after being impinged by electromagnetic radiation that is irradiated through the first guiding element onto the first processing element, the first processing element in the region of impingement comprises at least a first processed region in the form of a transparent region or translucent region or a hole. The first guiding element and the first processed region at least partially overlap when viewed along the extension direction, whereby the first security element is generated.

That is to say, the first security element according to the invention is comprised of one or more transparent regions, translucent regions or holes, i.e. regions that are not semi-opaque or opaque. Consequently, the first security element according to the invention is apparent as a virtual security element from a front side of the data carrier as well as from an opposing back side of the data carrier. This is in contrast to the security elements known in the art, which are of a dark appearance and appear as virtual security elements only from a front side of the data carrier. The fact that the first security element according to the invention is apparent from both sides of the data carrier renders a manipulation more difficult. As a result, the security is enhanced.

The first security element can appear as a floating security element or as a sinking security element when the data carrier is observed in top view and under one or more first viewing angles. Additionally or alternatively the first security element can appear as a sinking security element or as a floating security element when the data carrier is observed in bottom view and under one or more second viewing angles.

To this end it is particularly preferred that the first security element is configured such, that it appears as a floating security element when the data carrier is observed in top view and under one or more first viewing angles and as a sinking security element when the data carrier is in bottom view and under one or more second viewing angles, or vice versa. That is, the first security element preferably appears differently, i.e. either as sinking or as floating, when the data carrier is observed in top view and under one or more first viewing angles as compared to the situation where the same data carrier is observed in bottom view and under one or more second viewing angles. The data carrier is observed in top view and under one or more first viewing angles if a front side of the data carrier is observed.

Likewise, the data carrier is observed in bottom view and under one or more second viewing angles if a back side of the data carrier is observed. The front side of the data carrier is said side of the data carrier where the first guiding element is arranged on. Correspondingly, the back side of the data carrier is said side of the data carrier that lies opposite to the first guiding element.

For example, the data carrier can be observed in top view and in an untilted manner. In this case, an observer views a front side of the data carrier under a first viewing angle of 90° with respect to a horizontal direction running perpendicularly to the extension direction. Or, in other words, the observer views the front side of the data carrier under a first viewing angle of 0° with respect to the extension direction. However, it is also conceivable to view the data carrier in a tilted manner. In this case, an observer views the front side of the data carrier under a first viewing angle being different from 90° with respect to the horizontal direction or being different from 0° with respect to the extension direction, respectively. The expression "one or more first viewing angles" shall indicate that the first security element can appear as a floating or sinking element if the data carrier is viewed in top view in an untilted manner but also in one or more differently tilted manners.

Likewise, the data carrier can be observed in bottom view and in an untilted manner. In this case, an observer views a back side of the data carrier under a second viewing angle of 90° with respect to a horizontal direction running perpendicularly to the extension direction. Or, in other words, the observer views the back side of the data carrier under a second viewing angle of 0° with respect to a counter direction running perpendicularly to the extension direction. However, it is also conceivable to view the data carrier in a tilted manner. In this case, an observer views the back side of the data carrier under a second viewing angle being different from 90° with respect to the horizontal direction or being different from 0° with respect to the counter direction, respectively. The expression "one or more second viewing angles" shall indicate that the first security element can appear as a floating or sinking element if the data carrier is viewed in bottom view in an untilted manner but also in one or more differently tilted manners.

A floating security element corresponds to a security element that appears above a surface of the data carrier. This is in contrast to a sinking security element which corresponds to a security element that appears below a surface of the data carrier. It should be noted that this appearance represents a virtual appearance, i.e. a virtual image of the security element, and does not correspond to a physical appearance of the security element. Rather, this appearance can be understood as an optical effect generated by the security element, in particular by the guiding element and the processed regions of the processing element. Moreover, the security element can be said to be purely floating or purely sinking if the data carrier is viewed in an untilted manner, i.e. along the extension direction or along the counter direction. However, if the data carrier is tilted, then said security element can be said to further correspond to a tilting security element. The term "tilting" is used herein to indicate that the security element appears with varying depth perception if it is tilted. Again in other words, a tilting security element appears as moving when the data carrier is tilted. A security element lasered at a given angle can only be seen at that angle.

The first security element can be configured so as to be visible by naked eye when the data carrier is observed in top view and under one or more first viewing angles and/or in bottom view and under one or more second viewing angles. A security element that is visible by naked eye means that no auxiliary means are needed by an observer in order to observe the security element. Alternatively, the first security element can be configured so as to be visible in top view and under one or more first viewing angles and/or in bottom view and under one or more second viewing angles upon an illumination of the data carrier. An illumination of the data carrier can be achieved by illuminating the data carrier with light of a light source such as a flashlight or the like. For example, if the first security element is configured as a sinking (floating) security element when the data carrier is observed in bottom view, an appearance of said sinking (floating) security element could be made possible or at least enhanced if a front side of the data carrier is illuminated. To this end the data carrier could be illuminated before the first guiding element with respect to the extension direction. The same of course applies to a first security element that is configured as sinking (floating) security element when the data carrier is observed in top view, wherein an illumination of the data carrier preferably takes place on the back side of the data carrier.

The first security element is particularly preferably configured such, that it appears as a floating element being visible by naked eye when viewed in top view (bottom view), and that it appears as a sinking element that is visible upon illumination when viewed in bottom view (top view). A first security element that is not visible by naked eye is referred to as a covert security element. A first security element that is visible by naked eye is referred to as overt security element.

The first processing element can be arranged in a window or in a semi-opaque region of the data carrier. A window corresponds to an empty or void region such as a recess within the data carrier or to a transparent region. The transparent region is preferably provided by means of one or more transparent materials, preferably plastics, particularly preferably transparent plastics as they are used in the card industry, e.g. polycarbonate (PC), polyethylene terephthalate (PET), amorphous polyester and co-polyester (A-PET, PET-G) and semi-crystalline polyester (boPET).

The first processed region preferably corresponds to an ablated region, preferably a laser-ablated region or to a bleached region, preferably a laser-bleached region. Hence, it is conceivable that the first processed region is generated by means of ablating the first processing element, and wherein the ablation results in a hole within the first processing element. It is likewise conceivable that the ablation bleaches the first processing element such that a transparent region or a translucent region formed within the first processing element. Whereas in the former case material of the first processing element is removed by the ablation, in the latter case the material is not removed by the ablation but altered in appearance.

The first processing element can comprise at least one of a metal compound and a polymer. The metal compound preferably comprises or consists of at least one of aluminium, copper, gold, silver, zinc and tin. Additionally or alternatively the metal compound is preferably provided as a vapour coating or as a metallic ink or embedded in a polymer. For example, it is conceivable to provide the first processing element as metal nano-particles compounded in a polymer, which could be thinly coated at a micro-meter scale, for example. Other conceivable examples comprise coatable or printable metallic inks as they are known in the art. However, it is likewise conceivable that the first processing element is provided as a laser-sensitive polymer.

Furthermore, the first processing element can be provided in the form of a layer which extends partially or entirely along a horizontal direction running perpendicularly to the extension direction. Conceivable layers are a metal-comprising layer, a metal-comprising coating layer or a metal-comprising ink layer. A metal-comprising ink layer could be a layer that is generated by printing a printable metal ink.

The first processing element preferably has a thickness with respect to the extension direction being in the range of about 1 nanometer to 900 micrometer, preferably in the range of about 10 nanometer to 50 micrometer, and particularly preferably in the range of about 20 nanometer to 1 micrometer. Said thickness corresponds to the thickness of the first processing element in the unprocessed state.

Two or more first processed regions can be arranged at a horizontal distance from one another with respect to a horizontal direction running perpendicularly with respect to the extension direction. The two or more first processed regions are preferably arranged according to at least a first processing pattern.

Said two or more first processed regions can constitute an alphanumeric character and/or an image. In other words, the first processing pattern can constitute an alphanumeric character and/or image. An alphanumeric character could be a name of a person or of a country, a document number, a registration number, or a code, for example. An image could be a photograph, a portrait, the outline of a country, a national coat of arms, a national flag, or a graphical information item, for example.

The first guiding element preferably corresponds to a lens element, the lens element preferably having a spherical or a semi-spherical or an aspherical shape. A diameter of the lens is preferably between about 5 micrometer to 500 micrometer, particularly, preferably between about 15 to 275 micrometer.

The first guiding element can be configured such, that a focus of the electromagnetic radiation being irradiated through the first guiding element onto the first processing element lies before the first processing element, at the first processing element, or after the first processing element with respect to the extension direction.

If the focus lies before the first processing element with respect to the extension direction, then the first security element will appear as a floating security element when the data carrier is observed in top view under the one or more first viewing angles and as a sinking security element when the data carrier is observed in bottom view under the one or more second viewing angles.

If the focus lies at the first processing element with respect to the extension direction, then the first security element will appear on the surface of the data carrier.

If the focus lies after the first processing element with respect to the extension direction, then the first security element will appear as a sinking security element when the data carrier is observed in top view under the one or more first viewing angles and as a floating security element when the data carrier is observed in bottom view under the one or more second viewing angles.

Hence, by choosing one or more first guiding elements such as lenses with a particular focal length an appearance of the first security element can be determined. However, said appearance can likewise be determined by a vertical distance between the first guiding element and the first processing element.

Namely, a vertical distance between the first guiding element and the first processing element can be such, that a focus of the electromagnetic radiation being irradiated through the first guiding element onto the first processing element lies before the first processing element, at the first processing element, or after the first processing element with respect to the extension direction.

In the first case, the first security element will appear as a floating security element when the data carrier is observed in top view under the one or more first viewing angles and as a sinking security element when the data carrier is observed in bottom view under the one or more second viewing angles.

In the second case, the first security element will appear on the surface of the data carrier. In the third case, the first security element will appear as a sinking security element when the data carrier is observed in top view under the one or more first viewing angles and as a floating security element when the data carrier is observed in bottom view under the one or more second viewing angles.

The data carrier can comprise two or more first guiding elements, wherein the two or more first guiding elements are arranged immediately adjacent to one another or at a horizontal distance from one another with respect to a horizontal direction running perpendicularly with respect to the extension direction. The data carrier preferably comprises a plurality of first guiding elements that are arranged according to at least a first guiding pattern and/or according to at least a first guiding array. Hence, in the preferred case of the first guiding element being a lens element, it is conceivable to provide two or more lenses, in particular a plurality of lenses. Said lenses can be arranged in a pattern or an array. Hence, it is particularly preferred to provide a plurality of first guiding elements in the form of lenslets.

The data carrier can further comprise at least a second guiding element which is arranged before the first processing element with respect to the extension direction, wherein the second guiding element is configured to guide impinging electromagnetic radiation towards the first processing element along a second guiding direction being different from a first guiding direction associated with the direction of electromagnetic radiation being impinging on the first guiding element, and/or wherein the second guiding element has a second focal length that is different from a first focal length being associated with the first guiding element.

For example, one or more second guiding elements in the form of lens elements as described above could be provided. A design of said second lens element(s) can be different from a design of the first lens element(s). For example, the first and second lens elements could differ in their focal length or in their deflection properties.

The first guiding element and the second guiding element can be arranged immediately adjacent to one another or at a horizontal distance from one another with respect to a horizontal distance running perpendicularly with respect to the extension direction. Additionally or alternatively the data carrier can comprise a plurality of second guiding elements that are arranged according to at least a second guiding pattern and/or according to at least a second guiding array. Hence, and as has already been mentioned above, it is preferred that the second guiding element(s) are lens elements which can be arranged in a pattern or an array such as in the form of lenslets. To this end said pattern or array could comprise the same type of lens elements, for example only first lens elements or only second lens elements, or a combination of first and second lens elements. Furthermore, it is conceivable that one or more of the first lens elements and/or of the second lens elements and/or one or more lens patterns or lens arrays being constituted of the same or of different lens elements are arranged immediately adjacent to one another or spaced apart from one another. That is, a variety of different arrangements of conceivable.

The data carrier can further comprises at least a first transparent carrier element, wherein said first carrier element is arranged after the first guiding element with respect to the extension direction, and wherein at least one of i) the first guiding element is arranged on a top surface of said first carrier element and ii) the first processing element is arranged on a bottom surface of said first carrier element or embedded within said first carrier element. The first transparent carrier element preferably corresponds to a transparent plastics as they are used in the card industry, e.g. polycarbonate (PC), polyethylene terephthalate (PET), amorphous polyester and co-polyester (A-PET, PET-G) and semi-crystalline polyester (boPET).

It is conceivable that the data carrier comprises two or more of such layers. In particular, the data carrier can comprise a multi-layer structure, wherein two or more transparent layers are present. Moreover, various arrangements of one or more first processing elements within said multi-layer structure are conceivable. For example, the data carrier can further comprise at least a second transparent carrier element, wherein said second carrier element is arranged after the first carrier element with respect to the extension direction, and wherein the first processing element is arranged on a top surface of said second carrier element or on a bottom surface of said second carrier element or embedded within said second carrier element.

In a further aspect a security document comprising at least one data carrier as described above is provided, wherein the security document preferably is an identity card, a passport, a credit card, a bank note or the like. At this point it should be understood that the data carrier per se can correspond to a security document. This is the case if the data carrier is provided in the form of an identity card, for example. However, it is likewise conceivable to introduce or incorporate the data carrier into a security document. In the case of a passport for example the data carrier could correspond to or could be incorporated in a page of the passport In a further aspect a method of producing at least a first security element in a data carrier, preferably in a data carrier as described above, is provided, wherein the method comprises the steps of:

Providing at least a first guiding element; and

Providing at least a first processing element; The first processing element is arranged after the first guiding element with respect to an extension direction. The first guiding element is configured to guide impinging electromagnetic radiation towards the first processing element. The first processing element, in an unprocessed state, is semi-opaque or opaque. The method further comprises the step of:

Processing the first processing element by irradiating electromagnetic radiation through the first guiding element onto the first processing element such that at least a first processed region in the form of a transparent region or translucent region or a hole is formed in the first processing element in the region of impingement, and wherein the first guiding element and the first processed region at least partially overlap when viewed along the extension direction, whereby the first security element is generated.

The electromagnetic radiation preferably corresponds to laser radiation that is irradiated onto the data carrier. The one or more first processed regions can be generated following a pattern of the laser energy that is focused by the first guiding element. To this end, the pattern of the laser energy can be provided by a digitized image and/or alphanumeric character that is fed to a computer that guides the laser radiation accordingly.

The first guiding element preferably corresponds to one or more lenses which are produced by casting and curing a transparent plastics such as polycarbonate or any other transparent film on one side of the transparent plastics or film. The first processing element preferably comprises at least one of a metal compound and a polymer which are arranged on another side of said transparent plastics or film. A polymer layer or film that is generated in this manner can be bundled with other stack of layers or films so as to create a desired thickness of the data carrier.

As just mentioned, the data carrier preferably correspond to a data carrier as described above. Hence, any statements and explanations provided with regard to the data carrier and its security element can likewise apply to the method of producing the security element in the data carrier.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 4b shows a bottom view on the data carrier according to FIG. 4a;

FIG. 5b shows a bottom view on the data carrier according to FIG. 5a;

FIG. 6b shows an enlarged view of the security element of the data carrier according to FIG. 6a;

FIG. 7b shows an enlarged view of the security element of the data carrier according to FIG. 7a.

DESCRIPTION OF PREFERRED EMBODIMENTS

Figure 1:
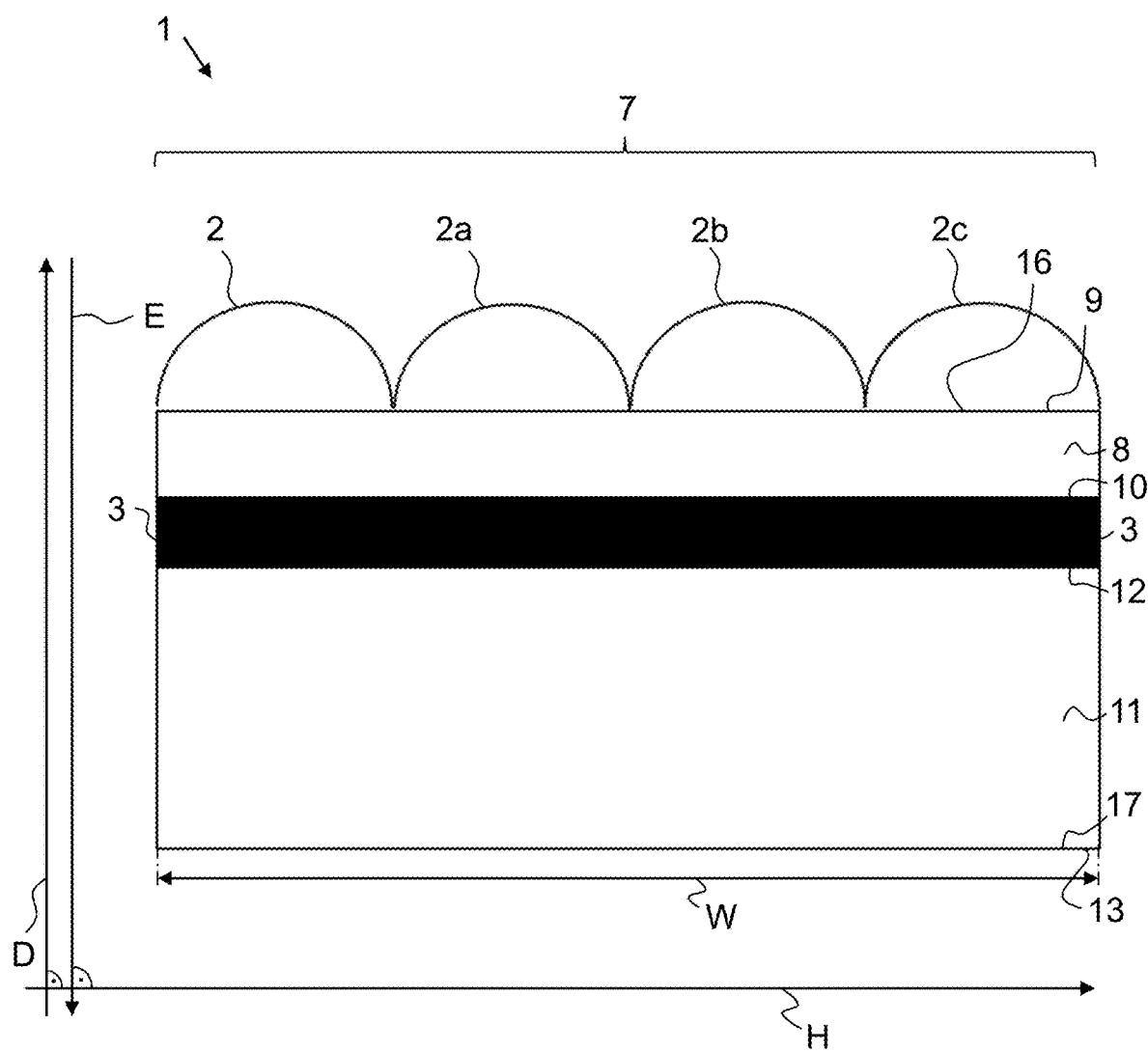
FIG. 1 shows a sectional view through a data carrier in an unprocessed state.
Figure 2:
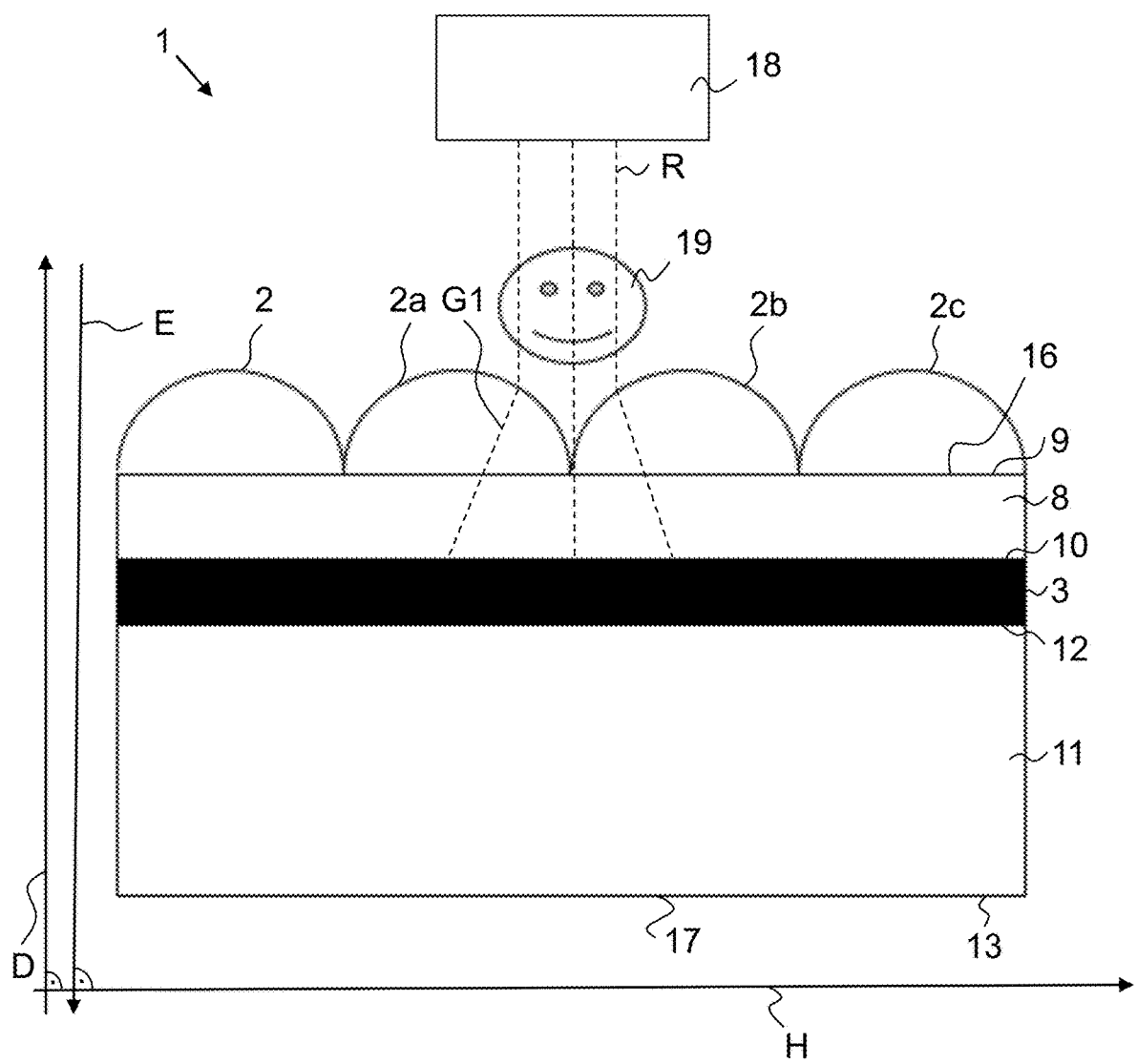
FIG. 2 shows a sectional view through the data carrier according to FIG. 1 during processing.
Figure 3:
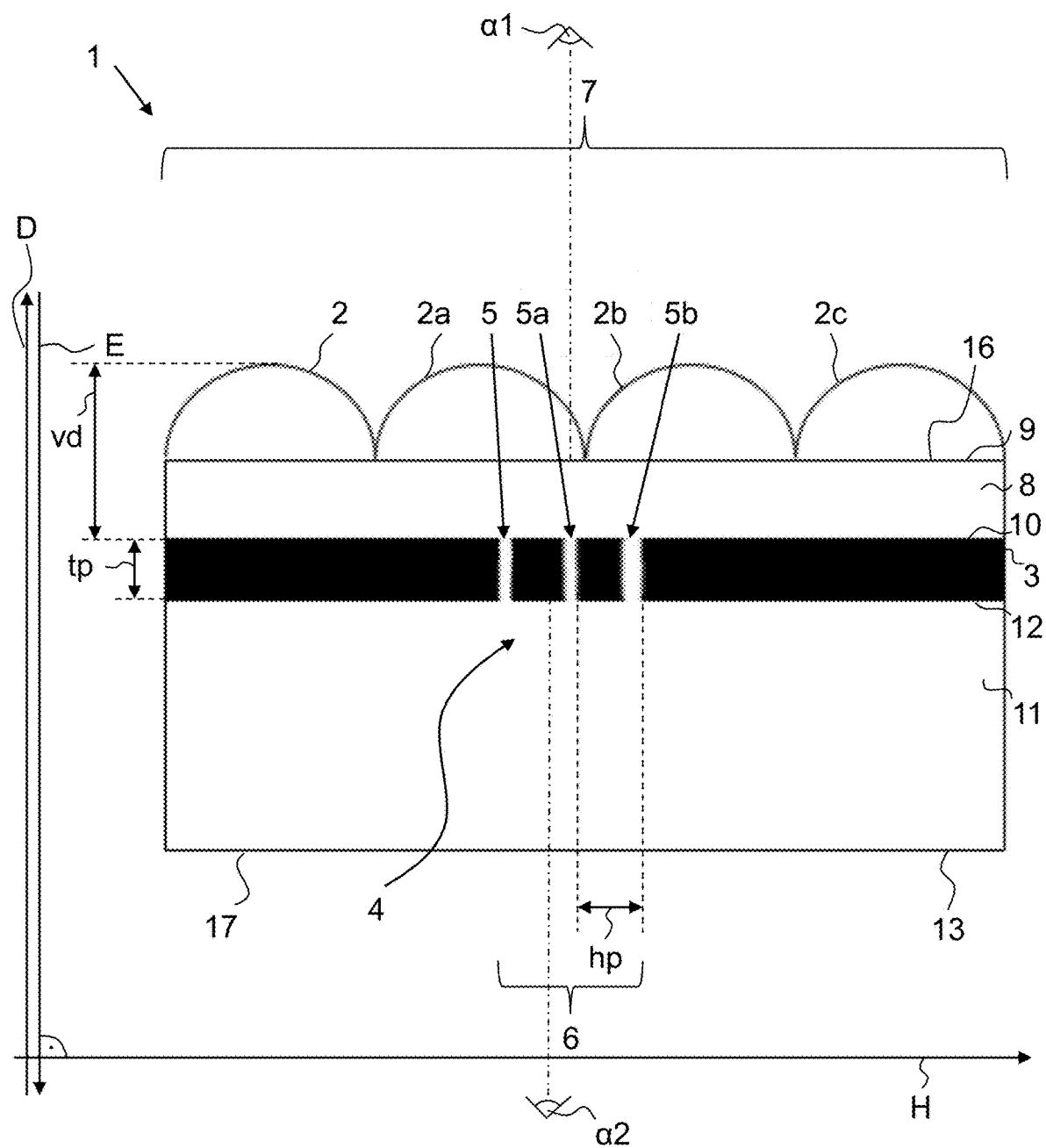
FIG. 3 shows a sectional view through the data carrier according to FIG. 1 after processing and in a processed state, wherein a security element is generated.
Figure 4A:
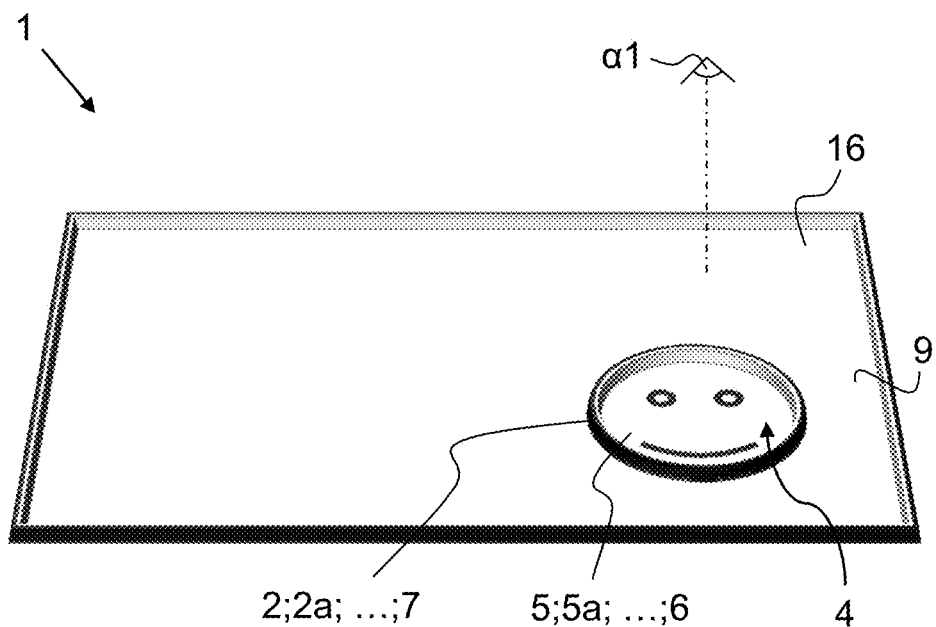
FIG. 4a shows a top view on a data carrier comprising a security element.
Figure 4B:
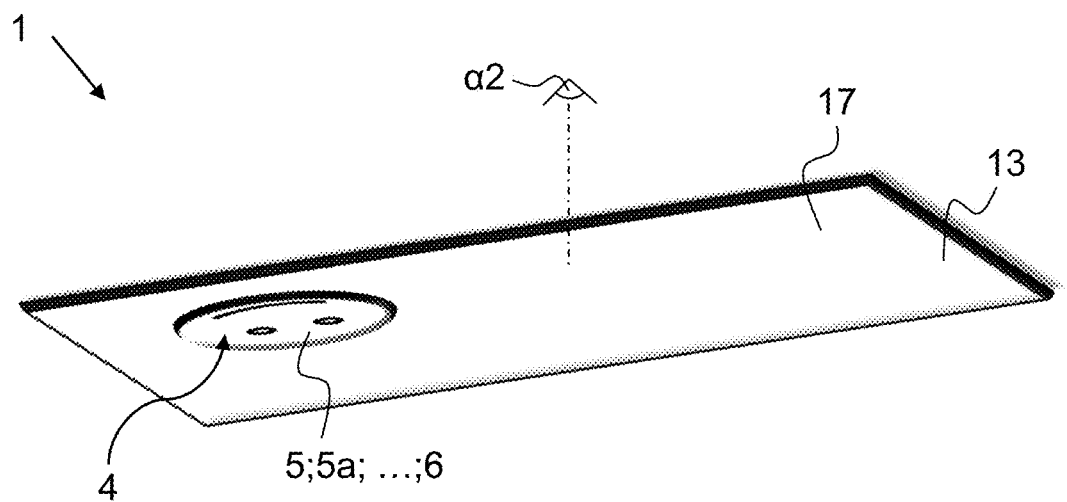

FIGS. 1 to 3 schematically depict a method of producing at least one security element 4 in a data carrier 1 according to the invention.

In particular, said data carrier 1 comprises first guiding elements 2, 2a, 2b, 2c and a first processing element 3, wherein the first processing element 3 is arranged after the first guiding elements 2, 2a, 2b, 2c with respect to an extension direction E. Between the first guiding elements 2, 2a, 2b, 2c and the processing element 3 there is provided a first transparent carrier element 8. That is, said first carrier element 8 is arranged after the first guiding element 2 but before the first processing element 3 with respect to the extension direction E. Here, the first guiding element 2 is arranged on a top surface 9 of said first carrier element 8 and the first processing element 3 is arranged on a bottom surface 10 of said first carrier element 8. The carrier element 8 corresponds to a layer being made of transparent plastics as they are used in the card industry, e.g. polycarbonate (PC), polyethylene terephthalate (PET), amorphous polyester and co-polyester (A-PET, PET-G) and semi-crystalline polyester (boPET). In particular, the depicted data carrier 1 corresponds here to a two-layer structure, wherein a second transparent carrier element 11 in the form of a layer is arranged after the first processing element 3 with respect to the extension direction E.

The first processing element 3 corresponds here to a metal compound being provided as a vapour coating or as a metallic ink or to a laser-sensitive polymer. A thickness tp of the first processing element 3 with respect to the extension direction E is in the range of about 1 nanometer to 100 micrometer, preferably in the range of about 10 nanometer to 50 micrometer, and particularly preferably in the range of about 20 nanometer to 1 micrometer. In the present example, the first processing element 3 is provided in the form of a layer which extends entirely along a width W of the data carrier 1. The first guiding elements 2, 2a, 2b, 2c are configured to guide impinging electromagnetic radiation R towards the first processing element 3 along one or more guiding directions G1 and correspond to lens elements, which are here of a semi-spherical shape. The lens elements 2, 2a, 2b, 2c are arranged immediately adjacent to one another with respect to a horizontal direction H running perpendicularly with respect to the extension direction E and form an array 7 of lenslets.

In an unprocessed state, i.e. before an impingement of radiation R, the first processing element 3 is semi-opaque or opaque, see FIGS. 1 and 2. However, in a processed state and after being impinged by electromagnetic radiation R that is irradiated through the lens elements 2, 2, 2b, 2c onto the first processing element 3, the first processing element 3 in the region of impingement comprises first processed regions 5, 5a, 5b in the form of transparent regions or translucent regions or holes, respectively, see FIG. 3. Said transparent or translucent regions 5, 5a, 5b correspond to laser-bleached regions, wherein the irradiated electromagnetic radiation R has altered the opaque or semi-opaque appearance of the unprocessed processing element 3 into a transparent or translucent appearance. If holes 5, 5a, 5b are generated, then said holes preferably correspond to laser-ablated regions. Moreover, and as follows from FIG. 3, the lens elements 2, 2a, 2b, 2c and the first processed regions 5, 5a, 5b at least partially overlap when viewed along the extension direction E, whereby the first security element 4 is generated.

In the present example three processed regions 5, 5a, 5b are generated by the irradiated electromagnetic radiation R, which processed regions 5, 5a, 5b are arranged at a horizontal distance hp from one another with respect to the horizontal direction H. Furthermore, said processed regions 5, 5a, 5b are produced according to a processing pattern 6. The processing pattern 6 can correspond to an alphanumeric character and/or an image, see FIGS. 4a to 7b.

Since the processed regions 5, 5a, 5b are provided in combination with lens elements 2, 2a, 2b, 2c, the security element 4 appears as a floating security element when the data carrier 1 is observed in top view and under one or more first viewing angles α1 and as a sinking security element when the data carrier 1 is observed in bottom view and under one or more second viewing angles α2. Alternatively, it is likewise conceivable that the security element 4 appears as a sinking security element when the data carrier 1 is observed in top view and under the one or more first viewing angles α1 and as a floating security element when the data carrier 1 is observed in bottom view and under the one or more second viewing angles α2. The appearance of the security element 4 as either a floating or sinking security element when viewed in top view or in bottom view, respectively, is determined by the focus of the impinging electromagnetic radiation R. The focus is determined by a focal length of the lens elements 2, 2a, 2b, 2c and/or a vertical distance vd between the lens elements 2, 2a, 2b, 2c and the first processing element 3. In particular, the lens elements 2, 2a, 2b, 2c can have a focal length which is such, that the focus of the electromagnetic radiation R being irradiated through the lens elements 2, 2a, 2b, 2c onto the first processing element 3 lies before the first processing element 3 or after the first processing element 3 with respect to the extension direction E. In the former case, a floating security element is generated, whereas in the latter case, a sinking security element is generated. Likewise, the vertical distance vd between the first guiding element 2, 2a, 2b, 2c and the first processing element 3 can be chosen such, that the focus of the electromagnetic radiation R being irradiated through the lens elements 2, 2a, 2b, 2c onto the first processing element 3 lies before the first processing element 3 or after the first processing element 3 with respect to the extension direction E. Here, too, a floating security element is generated in the former case and a sinking security element is generated in the latter case. For example, if the focal length of the lens elements 2, 2a, 2b, 2c and/or the vertical distance vd between the lens elements 2, 2a, 2b, 2c and the first processing element 3 is such, that the focus of the irradiated electromagnetic radiation R lies before the first processing element 3 with respect to the extension direction E, then the security element will appear as a floating security element when the carrier 1 is observed in top view and under the one or more first viewing angles first viewing angle. The data carrier 1 is observed in top view if a front side 16 of the data carrier 1 is observed. The front side 16 of the data carrier 1 comprises the uppermost surface of the data carrier 1, which is here the top surface 9 of the first carrier element 8 on which the lens elements 2, 2a, 2b, 2c are arranged. Consequently, said security element 4 will appear as sinking element when the data carrier 1 is observed in bottom view and under the one or more second viewing angles α2. The data carrier 1 is observed in bottom view if a back side 17 of the data carrier 1 is observed. The back side 17 of the data carrier 1 is said side of the data carrier 1 that lies opposite to the front side 16, i.e. surface 9 comprising the lens elements 2, 2a, 2b, 2c, which is here a bottom surface 13 of the second transparent carrier element 11.

The processing of the processing element 3 in order to generate the processed regions 5, 5a, 5b within the processing element 3 is schematically illustrated in FIG. 2, and the processed data carrier 1 comprising processed regions 5, 5a, 5b within the processing element 3 is illustrated in FIG. 3. To this end and as follows from FIG. 2, electromagnetic radiation R from a radiation source 18 such as a laser is irradiated onto the data carrier 1 according to a particular pattern 19, which particular pattern is provided to the laser by means of a digitized image and/or alphanumeric character that is fed to a computer that guides the laser 18 accordingly. Here, the particular pattern 19 corresponds to an image in the shape of a smiley. Although not visible in FIG. 2, the focus of the irradiated laser radiation R lies above the first processing element 3 with respect to the extension direction E. As follows from FIGS. 4a and 4b, the security element 4 in the form of the smiley therefore appears as a floating security element if a front side 16 of the data carrier 1 is observed in top view under the one or more first viewing angles α1 and as a sinking security element if a back side 17 of the data carrier 1 is observed in bottom view under the one or more second viewing angles α2.

Figure 5A:
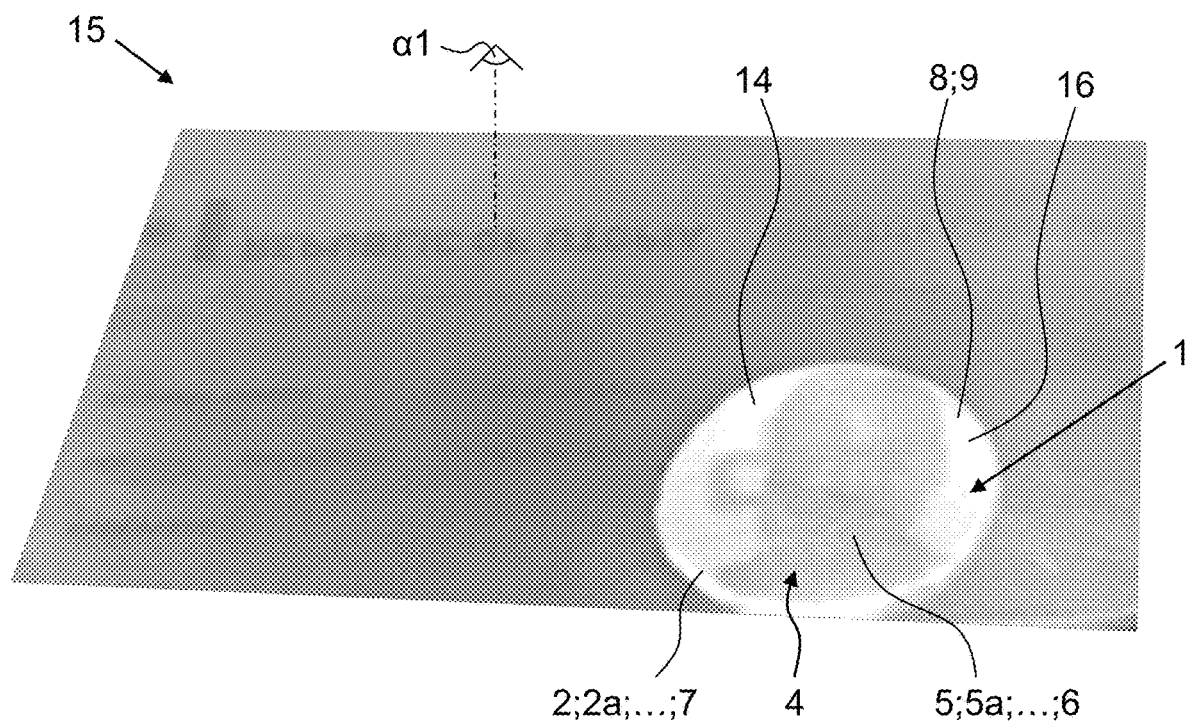
FIG. 5a shows a top view on another data carrier comprising a security element.
Figure 5B:
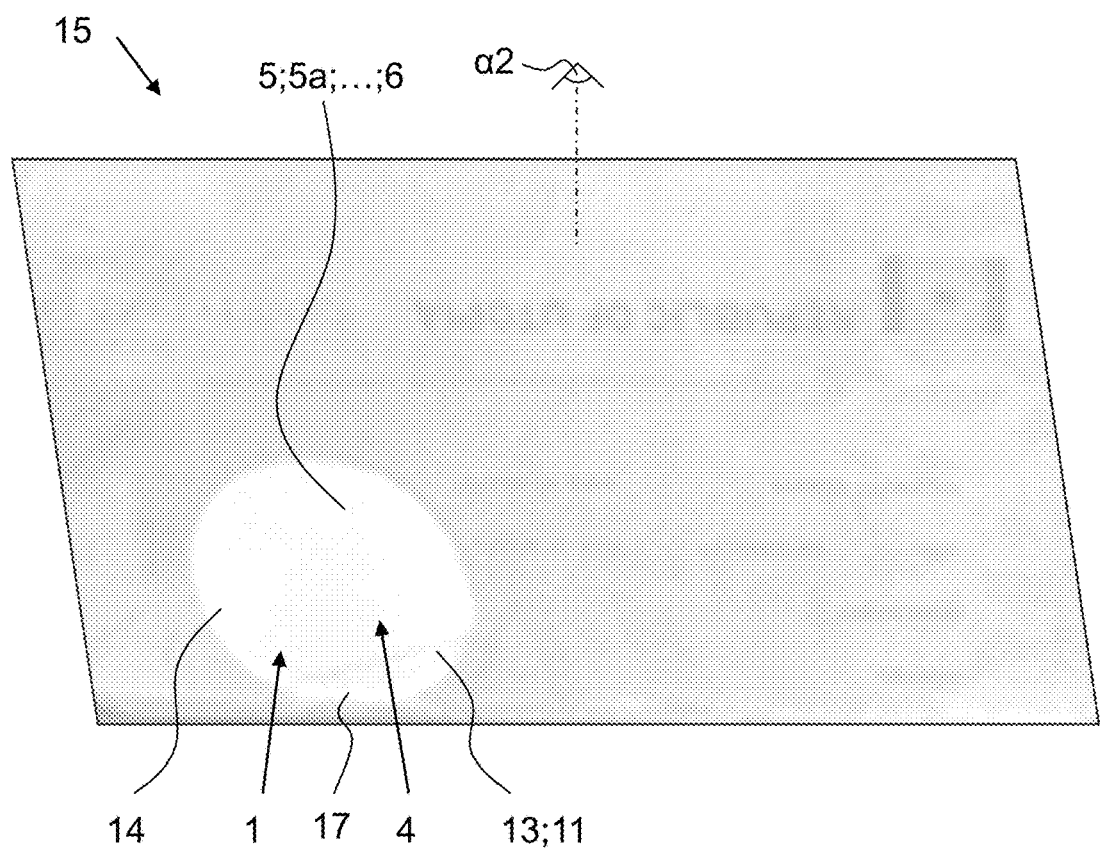
Figure 6A:
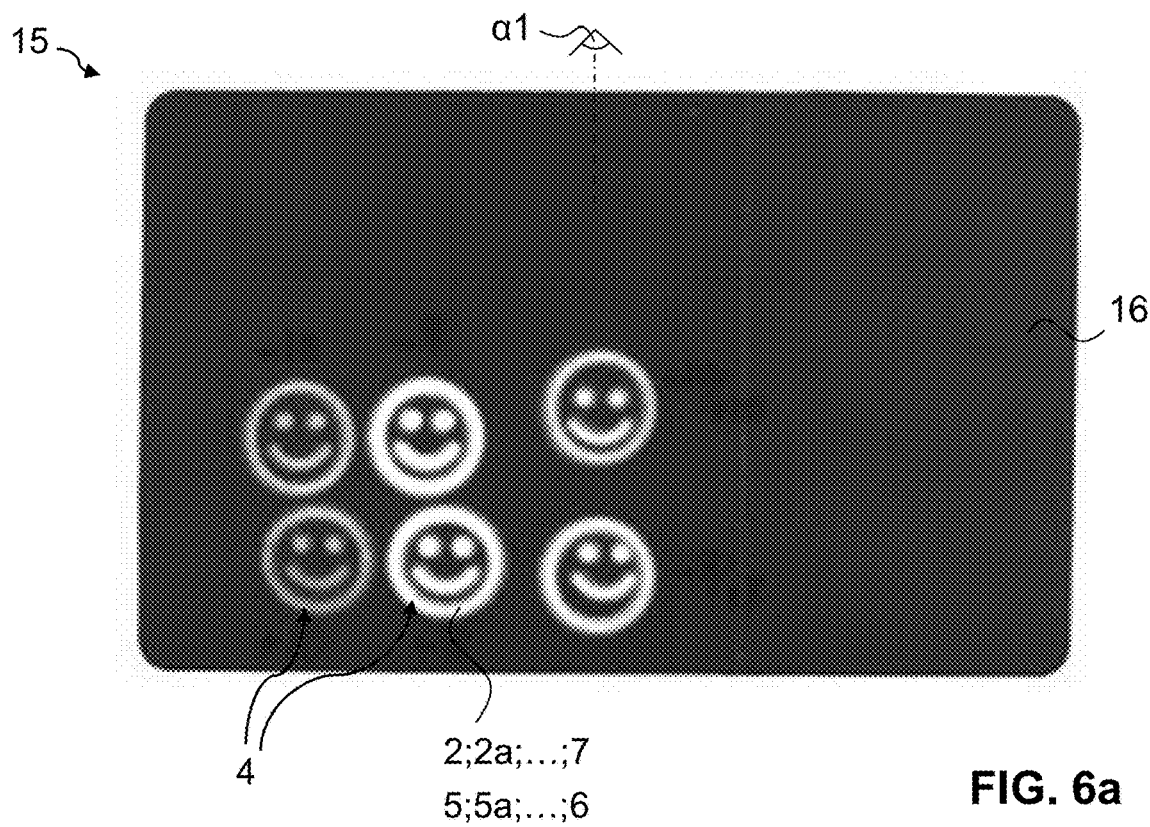
FIG. 6a shows a top view on another data carrier comprising several security elements.
Figure 6B:
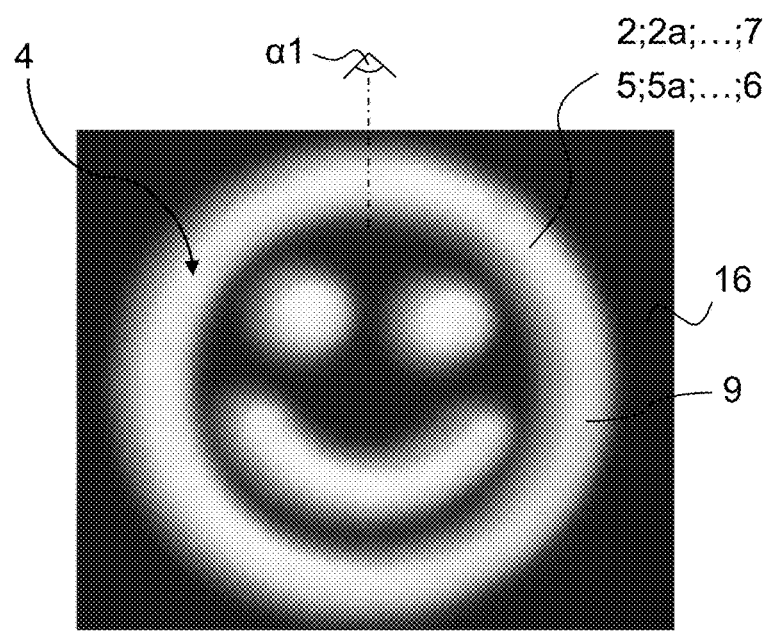
Figure 7A:
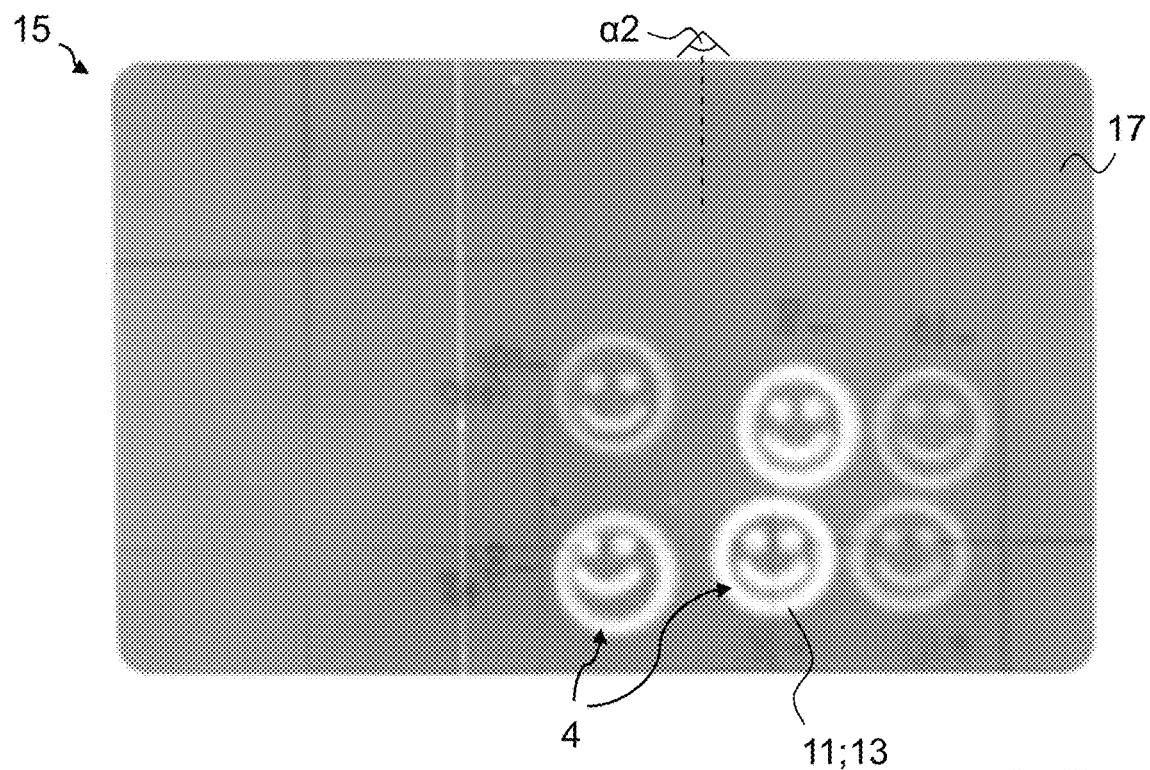
FIG. 7a shows a top view on another data carrier comprising several security elements.
Figure 7B:
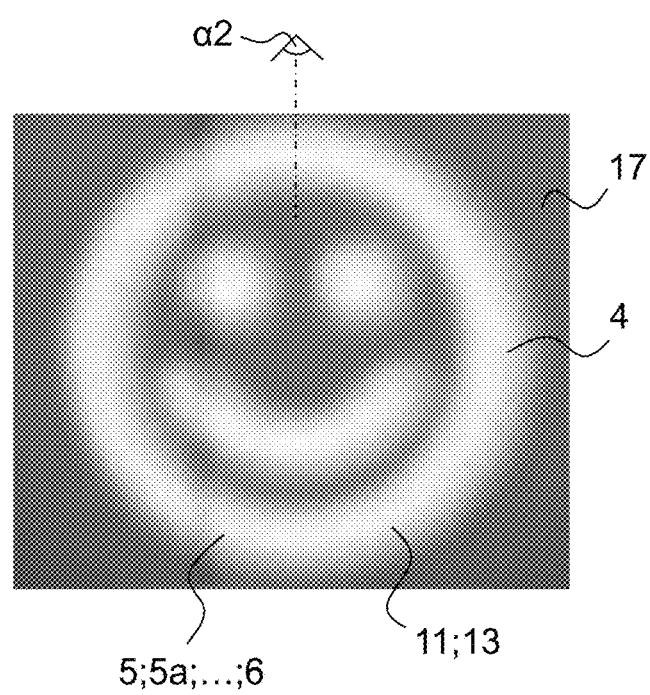

FIGS. 5a to 7b depict different real examples of different security elements 4 in data carriers 1 according to the invention. In fact, said real examples correspond to photographs that were taken from the data carriers 1. In particular, FIG. 5a depicts a front side 16 of a data carrier 1 and FIG. 5b depicts a back side 17 of said data carrier 1. The data carrier 1 is here embedded within a security document 15 in the form of an identity card, wherein transparent plastic layers 8, 11 of the data carrier 1 are arranged so as to form a window 14 within the security document 15. Within said window 14 the security element 4 in the form of a portrait is provided. The security element 4 has been generated such, that it appears as a floating element when the data carrier 1, and thus the security document 15, is observed in top view under the one or more first viewing angles α1. When seen in this view the security element 4 appears as an overt security element, i.e. as a security element that is visible by naked eye. However, when the data carrier 1, and thus the security document 15, is seen in bottom view under the one or more second viewing angles α2, the security element 4 is hardly visible by naked eye. That is, the security element 4 is further configured such, that it appears as a covert security element when the data carrier 1 is observed in bottom view. This is in contrast to the security elements 4 of the data carrier 1 according to FIGS. 6a to 7b, wherein FIG. 6a depicts a top view on the data carrier 1 and FIG. 7a depicts a bottom view on the data carrier 1. FIGS. 6b and 7b in each case depict an enlarged view of the data carrier 1, in particular of one of the security elements 4 in the form of a smiley, according to FIGS. 6a and 7a, respectively. As is readily apparent from these figures, the security elements 4 of this data carrier 1 are visible by naked eye in both views, top view and bottom view. However, since the lens elements 2, 2a, 2b, 2c are arranged on a top surface 9 of the data carrier which faces an observer when the data carrier is observed in top view, the security elements appear more defined and less blurry than it appears in bottom view.

LIST OF REFERENCE SIGNS 1 data carrier
2 guiding element
3 processing element 4 security element
5, 5a, ... processed region
6 processing pattern
7 guiding array
8 carrier element
9 top surface
10 bottom surface
11 carrier element
12 top surface
13 bottom surface
14 window
15 security document
16 front side
17 back side
18 radiation source
19 digitized pattern
E extension direction
H horizontal direction
G1 guiding direction
R radiation
tb thickness
hp horizontal direction
vd vertical distance
α1 first viewing angle
α2 second viewing angle

The invention claimed is:

1. A data carrier comprising:
at least a first guiding element;
at least a first processing element;
at least a first security element; and
at least a second guiding element which is arranged above the first processing element with respect to an extension direction,
wherein the first processing element is arranged below the first guiding element with respect to the extension direction,
wherein the first guiding element is configured to guide impinging electromagnetic radiation towards the first processing element,
wherein the first processing element, in an unprocessed state, is semi-opaque or opaque,
wherein, in a processed state after being impinged by electromagnetic radiation that is irradiated through the first guiding element onto the first processing element, a region of impingement of the first processing element comprises at least a first processed region in the form of a transparent region or translucent region or a hole,
wherein the first guiding element and the first processed region at least partially overlap when viewed along the extension direction, whereby the first security element is generated, and
wherein the second guiding element is configured to guide impinging electromagnetic radiation towards the first processing element along a second guiding direction being different from a first guiding direction associated with a direction of electromagnetic radiation being impinging on the first guiding element, and/or
wherein the second guiding element has a second focal length that is different from a first focal length being associated with the first guiding element.

2. The data carrier according to claim 1, wherein the first security element appears as a floating security element or as a sinking security element when the data carrier is observed in top view under one or more first viewing angles (α1), and/or
wherein the first security element appears as a sinking security element or as a floating security element when the data carrier is observed in bottom view under one or more second viewing angles.

3. The data carrier according to claim 1, wherein the first security element is visible by naked eye when the data carrier is observed in top view and under one or more first viewing angles) and/or in bottom view and under one or more second viewing angles, or
wherein the first security element is visible in top view and under one or more first viewing angles and/or in bottom view and under one or more second viewing angles upon an illumination of the data carrier.

4. The data carrier according to claim 1, wherein the first processed region corresponds to an ablated region or to a bleached region.

5. The data carrier according to claim 1, wherein the first processing element comprises at least one of a metal compound and a polymer, and
wherein the metal compound comprises or consists of at least one of aluminium, copper, gold, silver, zinc and tin, and/or
wherein the metal compound is provided as a vapour coating or as a metallic ink or embedded in a polymer, and/or
wherein the polymer is a laser-sensitive polymer.

6. The data carrier according to claim 1, wherein two or more first processed regions are arranged at a horizontal distance from one another with respect to a horizontal direction (H) running perpendicularly with respect to the extension direction, and
wherein the two or more first processed regions are arranged according to at least a first processing pattern.

7. The data carrier according to claim 6, wherein the two or more first processed regions constitute an alphanumeric character and/or an image.

8. The data carrier according to claim 1, wherein the first guiding element corresponds to a lens element, the lens element having a spherical or a semi-spherical or an aspherical shape.

9. The data carrier according to claim 1, wherein the first guiding element is configured such, that a focus of the electromagnetic radiation being irradiated through the first guiding element onto the first processing element lies above the first processing element, at the first processing element, or below the first processing element with respect to the extension direction.

10. The data carrier according to claim 1, wherein a vertical distance between the first guiding element and the first processing element is such, that a focus of the electromagnetic radiation being irradiated through the first guiding element onto the first processing element lies above the first processing element, at the first processing element, or below the first processing element with respect to the extension direction.

11. The data carrier according to claim 1, further comprising two or more first guiding elements, wherein the two or more first guiding elements are arranged immediately adjacent to one another or at a horizontal distance from one another with respect to a horizontal direction running perpendicularly with respect to the extension direction, and
wherein the data carrier comprises a plurality of first guiding elements that are arranged according to at least a first guiding pattern and/or according to at least a first guiding array.

12. The data carrier according to claim 1, further comprising at least a first transparent carrier element, wherein said first carrier element is arranged below the first guiding element with respect to the extension direction, and wherein at least one of i) the first guiding element is arranged on a top surface of said first carrier element and ii) the first processing element is arranged on a bottom surface of said first carrier element or embedded within said first carrier element.

13. A security document being an identity card, a passport, a credit card, or a bank note and comprising:
a data carrier having:
at least a first guiding element;
at least a first processing element;
at least a first security element; and
at least a second guiding element which is arranged above the first processing element with respect to an extension direction,
wherein the first processing element is arranged below the first guiding element with respect to the extension direction,
wherein the first guiding element is configured to guide impinging electromagnetic radiation towards the first processing element,
wherein the first processing element, in an unprocessed state, is semi-opaque or opaque,
wherein, in a processed state after being impinged by electromagnetic radiation that is irradiated through the first guiding element onto the first processing element, a region of impingement of the first processing element comprises at least a first processed region in the form of a transparent region or translucent region or a hole,
wherein the first guiding element and the first processed region at least partially overlap when viewed along the extension direction, whereby the first security element is generated, and
wherein the second guiding element is configured to guide impinging electromagnetic radiation towards the first processing element along a second guiding direction being different from a first guiding direction associated with a direction of electromagnetic radiation being impinging on the first guiding element, and/or
wherein the second guiding element has a second focal length that is different from a first focal length being associated with the first guiding element.

14. The security document of claim 13, wherein the first security element appears as a floating security element or as a sinking security element when the data carrier is observed in top view under one or more first viewing angles ($\alpha 1$), and/or
wherein the first security element appears as a sinking security element or as a floating security element when the data carrier is observed in bottom view under one or more second viewing angles.

15. The security document of claim 13, wherein the first security element is visible by naked eye when the data carrier is observed in top view and under one or more first viewing angles) and/or in bottom view and under one or more second viewing angles, or
wherein the first security element is visible in top view and under one or more first viewing angles and/or in bottom view and under one or more second viewing angles upon an illumination of the data carrier.

16. The security document of claim 13, wherein the first processed region corresponds to an ablated region or to a bleached region.

17. The security document of claim 13, wherein the first processing element comprises at least one of a metal compound and a polymer, and wherein the metal compound comprises or consists of at least one of aluminium, copper, gold, silver, zinc and tin, and/or
wherein the metal compound is provided as a vapour coating or as a metallic ink or embedded in a polymer, and/or
wherein the polymer is a laser-sensitive polymer.

18. The security document of claim 13, wherein two or more first processed regions are arranged at a horizontal distance from one another with respect to a horizontal direction (H) running perpendicularly with respect to the extension direction, and
wherein the two or more first processed regions are arranged according to at least a first processing pattern.

19. The security document of claim 18, wherein the two or more first processed regions constitute an alphanumeric character and/or an image.

20. The security document of claim 13, wherein the first guiding element corresponds to a lens element, the lens element having a spherical or a semi-spherical or an aspherical shape.

21. The security document of claim 13, wherein the first guiding element is configured such, that a focus of the electromagnetic radiation being irradiated through the first guiding element onto the first processing element lies above the first processing element, at the first processing element, or below the first processing element with respect to the extension direction.

22. The security document of claim 13, wherein a vertical distance between the first guiding element and the first processing element is such, that a focus of the electromagnetic radiation being irradiated through the first guiding element onto the first processing element lies above the first processing element, at the first processing element, or below the first processing element with respect to the extension direction.

23. The security document of claim 13, further comprising two or more first guiding elements, wherein the two or more first guiding elements are arranged immediately adjacent to one another or at a horizontal distance from one another with respect to a horizontal direction running perpendicularly with respect to the extension direction, and
wherein the data carrier comprises a plurality of first guiding elements that are arranged according to at least a first guiding pattern and/or according to at least a first guiding array.

24. The security document of claim 13, further comprising at least a first transparent carrier element, wherein said first carrier element is arranged below the first guiding element with respect to the extension direction, and
wherein at least one of i) the first guiding element is arranged on a top surface of said first carrier element and ii) the first processing element is arranged on a bottom surface of said first carrier element or embedded within said first carrier element.

25. A method of producing at least a first security element in a data carrier, the method comprising the steps of:
providing at least a first guiding element;
providing at least a first processing element; and
providing at least a second guiding element which is arranged above the first processing element with respect to an extension direction,
wherein the first processing element is arranged below the first guiding element with respect to an extension direction, wherein the first guiding element is configured to guide impinging electromagnetic radiation towards the first processing element, wherein the first processing element, in an unprocessed state, is semi-opaque or opaque, wherein the method further comprises the step of:

processing the first processing element by irradiating electromagnetic radiation through the first guiding element onto the first processing element such that at least a first processed region in the form of a transparent region or translucent region or a hole is formed in a region of impingement of the first processing element, wherein the first guiding element and the first processed region at least partially overlap when viewed along the extension direction, whereby the first security element is generated, and wherein the second guiding element is configured to guide impinging electromagnetic radiation towards the first processing element along a second guiding direction being different from a first guiding direction associated with a direction of electromagnetic radiation being impinging on the first guiding element, and/or wherein the second guiding element has a second focal length that is different from a first focal length being associated with the first guiding element.

* * * * *